(12) United States Patent
Kanno

(10) Patent No.: US 6,597,971 B2
(45) Date of Patent: Jul. 22, 2003

(54) DEVICE FOR AVOIDING INTERFERENCE

(75) Inventor: Ichiro Kanno, Yamanashi (JP)

(73) Assignee: Fanuc Ltd., Yamanashi (JP)

(*) Notice: Subject to any disclaimer, the term of this patent is extended or adjusted under 35 U.S.C. 154(b) by 0 days.

(21) Appl. No.: 10/140,999

(22) Filed: May 9, 2002

(65) Prior Publication Data

US 2002/0169522 A1 Nov. 14, 2002

(30) Foreign Application Priority Data

May 9, 2001 (JP) .......................................... 2001-138551

(51) Int. Cl.$^7$ ............................................. G06F 19/00
(52) U.S. Cl. ....................... 700/245; 700/119; 700/249; 700/251; 700/259; 700/263; 318/568.13; 318/568.15; 318/568.18; 318/568.19; 318/568.2; 901/5; 901/7; 901/15; 701/23
(58) Field of Search ........................... 700/95, 245, 119, 700/251, 249, 263, 259; 318/568.13, 568.15, 568.18, 568.2, 568.19; 29/12, 712; 702/84; 901/5, 7, 15; 701/23

(56) References Cited

U.S. PATENT DOCUMENTS

| | | | | |
|---|---|---|---|---|
| 4,338,672 A | * | 7/1982 | Perzley et al. ............... | 348/139 |
| 4,975,856 A | * | 12/1990 | Vold et al. ................... | 700/245 |
| 5,837,960 A | * | 11/1998 | Lewis et al. ............ | 219/121.63 |
| 5,917,726 A | * | 6/1999 | Pryor ........................... | 700/95 |
| 6,415,191 B1 | * | 7/2002 | Pryor ........................... | 700/95 |

OTHER PUBLICATIONS

Yanagihara et al., Parts–Picking in Disorded environment, 1991, IEEE, pp. 517–522.*

Rembold et al., Detection and handling of moving objects, 1998, IEEE, pp. 1332–1337.*

Saito et al.., Pick and Place operation of a micro object with high reliability and precision based on micro physics under SEM, 1999, IEEE, pp. 2763–2743.*

Okada et al., Planning for parts–picking tasks by using an active and multi–sensor visual system, 1996, IEEE, pp. 737–742.*

* cited by examiner

Primary Examiner—William A Cuchlinski, Jr.
Assistant Examiner—McDieunel Marc
(74) Attorney, Agent, or Firm—Staas & Halsey LLP (57) ABSTRACT

An interference avoiding device for determining occurrence of an interference in a robot operation in advance and automatically avoiding the interference, to be suitably applied to an automatic picking-up operation of randomly stored workpieces. A position/orientation of a workpiece and a position/orientation of a tool for getting hold of the workpiece in a teaching operation, and shapes/dimensions of the tool and the storage box are determined and stored in a storage device. A command position/orientation Ta of the tool for getting hold of an objective workpiece is determined based on a detected position/orientation Wa of the workpiece and it is determined whether or not an interference between the tool an the storage box will occur based on the position/orientation Ta and the stored information. If it is determined that an interference will occur, a rotational phase or an inclination angle of the tool with respect to the workpiece is changed within an allowable range of the position/orientation of the tool with respect to the workpiece, to obtain a new position/orientation of the tool. If it is determined that an interference will not occur under the new condition of the position/orientation of the tool, the new position/orientation is adopted. If an interference is still determined to occur, an alarm is issued and the operation of the robot is stopped.

42 Claims, 6 Drawing Sheets

DEVICE FOR AVOIDING INTERFERENCE

BACKGROUND OF THE INVENTION

1. Field of the Invention

The present invention relates to a technique of avoiding an interference in an operation to be performed by an industrial robot.

2. Description of the Related Art

In a picking operation of picking up a plurality of workpieces stored randomly in a storage box with a robot, it is necessary to control position/orientation of a robot and a tool, i.e. an end effector such as a robot hand, attached to a distal end of the robot so that the hand can hold one objective workpiece in the plurality of workpieces. Position/orientation of workpieces are scattered since these workpieces are stored randomly. Thus, the position/orientation of the tool and the robot arm has to be changed in accordance with position/orientation of the objective workpieces to be picked up, to cause an interference between the tool or the robot and a peripheral object such as the storage box storing the workpieces.

In general, if an interference is found in the teaching operation, the interference can be avoided by modifying the position/orientation of the tool in the teaching operation. However, it is not assured that the interference is avoided in an actual operation in the above picking operation. Thus, it has been necessary to place an objective workpiece to have predetermined position/orientation in every picking operation or prepare an ambience around the workpieces which never cause an interference.

Preparing a complete ambience around the randomly stored workpieces requires laborious work and a long time to be contrary to labor saving and automated operation by a robot.

If a workpiece is placed to have predetermined position/posture, it is possible for an operator to teach a robot so as not to cause an interference through an off-line programming. However, a burden on the operator increases as to how to avoid an interference by teaching the robot appropriate position/orientation of the tool.

SUMMARY OF THE INVENTION

The present invention provides an interference avoiding device capable of determining an interference in an robot operation in advance and avoiding the interference. With the interference avoiding device of the present invention, it is unnecessary to prepare a specific ambience around an object of operation of the robot even in a picking operation of randomly stored workpieces, to reduce a burden on an operator.

An interference avoiding device of the present invention comprises: storing means for storing information on shape/dimensions of a operational device attached to a robot, and shape/dimensions and position/orientation of a peripheral object; interference determining means for determining an interference between the operational device and the peripheral object based on the information stored in the storing means and a commanded position/orientation of the operational device; position/orientation setting means for setting a new position/orientation of the operational device for avoiding the interference between the operational device and the peripheral object in place of the commanded position/orientation of the tool, when it is determined that an interference will occur by the interference determining means.

The position/orientation setting means may automatically determine the new position/orientation of the operational device for avoiding the interference. Alternatively, the position/orientation setting means may select one of a plurality of predetermined positions/orientations.

Alternatively, the position/orientation setting means may set a newly taught position/orientation of the operational device for avoiding the interference.

The interference avoiding device may further comprise means for continuously operating the robot in accordance with the new position/orientation of the operational device.

The position/orientation setting means may stop an operation of the robot when it is determined that an interference will occur by the interference determining means.

The interference avoiding device may further comprise determining means for determining an interference between the operational device and the peripheral object on condition of the new position/orientation of the operational device, and display means for displaying a message when it is determined that an interference will occur by the determining means.

The interference avoiding device may further comprise determining means for determining an interference between the operational device and the peripheral object on condition of the new position/orientation of the operational device, and control means for suspending an operation of the robot when it is determined that an interference will occur by the determining means and then resuming the operation of the robot.

The position/orientation setting means may rewrite an operation program of the robot by replacing the commanded position/orientation of the tool with the new position/orientation for avoiding the interference.

The interference determining means may determine an interference between the operational device and the peripheral object in operation of the robot.

The interference avoiding device may be incorporated into a robot controller or an information processing device connected to the robot. The information processing device may include an operation simulation device of the robot.

The new position/orientation of the operational device may be used for obtaining information by means a sensor attached to the robot.

The commanded position/orientation of the operational device may be determined based on information obtained by a sensor attached to the robot. In this case, the storing means may store information on position/orientation of a workpiece in a teaching operation and position/orientation of a tool as the operational device for grasping the workpiece in the teaching operation, and the commanded position/orientation of the tool is determined based on the determined position/orientation of the workpiece and the stored information on the positions/orientations of the workpiece and the tool in the teaching operation. Alternatively, the storing means may store information on position/orientation of a tool as the operational device for holding a workpiece with respect to position/orientation of the workpiece in a teaching operation based on CAD information in an off-line teaching device, and the commanded position/orientation of the tool is determined based on the determined position/orientation of the workpiece and the stored information on the position/orientation of the tool with respect to the position/orientation of the workpiece.

The sensor may comprise a two-dimensional sensor or a three-dimensional sensor.

The operation to be performed by the robot may be a picking operation of picking up a workpiece by the operational device, and the peripheral object is a storage box storing workpieces. Further, the operation to be performed by the robot may be one of spot welding, arc welding and sealing.

The robot may be directly or indirectly fixed to a structure fixed on a floor, a wall or a ceiling, and may be arranged to be movable along one or two axes.

DETAILED DESCRIPTION OF THE PREFERRED EMBODIMENTS

Figure 1:
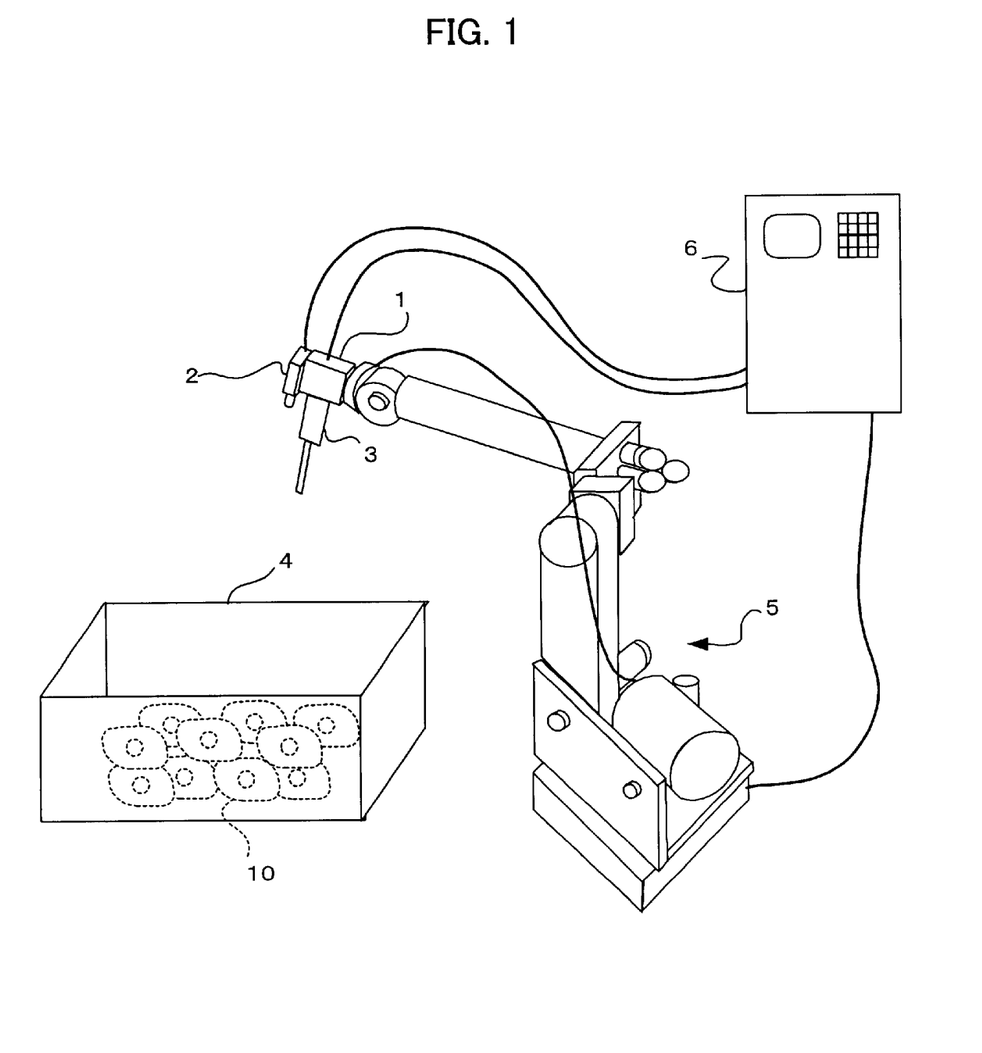
FIG. 1 is schematic view showing a picking operation of a robot controlled by a robot controller in which an interference avoiding device of the present invention is incorporated.

FIG. 1 shows an embodiment of the present invention in which an interference avoiding device is constituted by providing a robot controller for controlling an industrial robot with a software for avoiding an interference.

A tool 3 as an operational device for successively picking up a plurality of workpieces 10, a camera 2 as a two-dimensional visual sensor for capturing an image of workpieces 10 including an objective workpiece to be picked up, a laser beam projector 1 for projecting a laser beam are attached to a wrist provided at a distal end of an arm of a robot 5. A three-dimensional visual sensor is comprised of the camera 2 and the laser beam projector 1. In this embodiment, the plurality of workpieces 10 are randomly stored in a storage box 4, each having a random position/orientation.

The robot 5, the laser beam projector 1, the camera 2 and the tool 3 have conventional features and therefore detailed description thereof are omitted. The robot controller 6 has a conventional hardware architecture including a processor, a ROM, a RAM, a nonvolatile RAM, an data input device with a display, an input/output interface, a camera interface, servo controllers for controlling servomotors for respective joint axes of the robot 5. The laser beam projector 1 and the tool 3 are connected to the input/output interface and the camera 2 is connected to the camera interface.

For performing a picking-up operation of a workpiece 10, the robot 5 is operated to move the wrist to take a position/orientation at which the camera 2 on the wrist can capture an image of the workpieces including an objective workpiece as an object of the picking-up operation in the storage box 4 and then an image of the workpieces is captured by the camera 2 with projection of the laser beam from the laser beam projector 1 to detect position/orientation of the objective workpiece upon receipt of commands from the robot controller 6. The position/orientation of the tool 3 is controlled in accordance with the detected position/orientation of the objective workpiece and the workpiece is picked up by the tool 3 from the storage box 4. Details of the position/orientation of the tool in the picking-up operation will be described.

Figure 2:
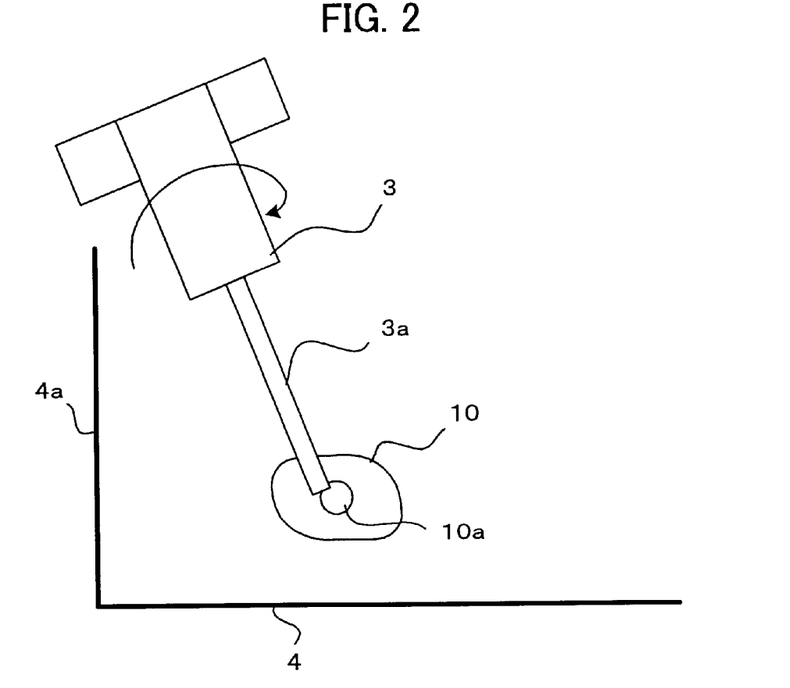
FIG. 2 is a schematic view showing the operation of picking up an objective workpiece by a tool attached to the robot as shown in FIG. 1.
Figure 3:
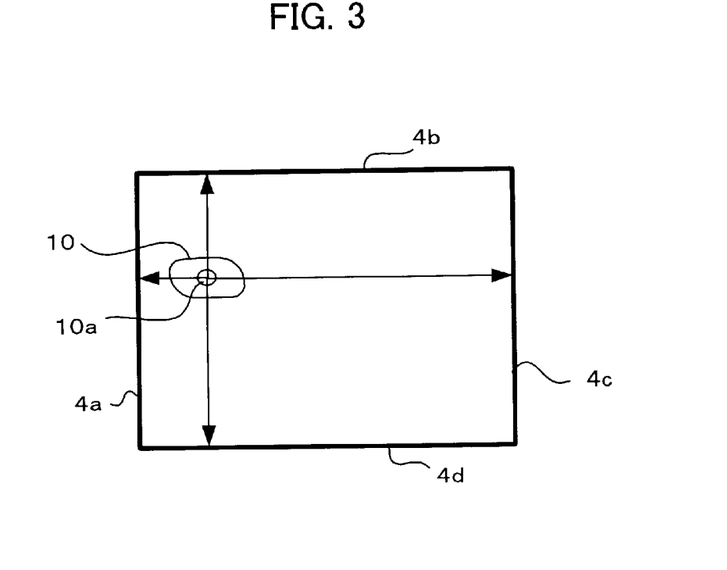
FIG. 3 is a schematic plan view showing a relationship between an objective workpiece and the tool box.

The position/orientation Ta of the tool 3 for getting hold of the objective workpiece 10 is determined according to the following equation (1), using a matrix Wn representing the position/orientation of the workpiece in a teaching operation, a matrix Tn representing the position/orientation of the tool 3 for getting hold of the workpiece having the position/orientation Wn in the teaching operation, and a matrix Wa representing the position/orientation of the objective workpiece detected by the three-dimensional sensor comprised of the camera 2 and the laser beam projector 1, $$Ta = Wa * Inv(Wn) * Tn \qquad (1)$$

where Inv(Wn) represents an inverse matrix of Wn.

The position/orientation Wn of the workpiece in the teaching operation, and the position/orientation Tn of the tool 3 for getting hold of the workpiece in the teaching operation, and further information on shapes and dimensions of the tool 3 and shapes and dimensions and positions/orientation of the storage box 4 are determined and stored in the memory of the robot controller 6 in advance, and it is determined whether or not the tool 3 will interfere with the storage box 4 based on the position/orientation Ta of the tool 3 determined according to the equation (1), the information on the shapes and dimensions of the tool 3, and the information on the shape and dimensions and the position/orientation of the storage box 4.

If it is determined that the tool 3 will interfere with the storage box 4, a new position/orientation of the tool 3 for getting hold of the workpiece without interfering with the tool box 4 is obtained within an allowable range of the position/orientation of the tool 3 for getting hold of the workpiece.

The allowable range of the position/orientation of the tool 3 is defined in dependence upon the shape and dimensions of the workpiece and a position or region at which the tool 3 gets hold of the workpiece. FIGS. 2–5 illustrate the allowable range of the position/orientation of the tool 3 in getting hold of the workpiece. In this embodiment, each workpiece 10 has a hole 10a at a center thereof, and the tool 3 is designed to get hold of the workpiece 10 by inserting claws 3a into the hole 10a and spreading the claws in the hole 10a. Thus, the tool 3 can get hold of the workpiece 10 with arbitrary rotational phase in inserting the claws into the hole 10a of the workpiece 10, i.e., rotational position of the claws in the hole 10a to get hold of and pick up the workpiece 10. This means that the tool 3 has a full angular allowable range with respect to rotation around a longitudinal axis of the claws 3a. On the other hand, an inserting angle at which the claw 3a of the tool 3 is inserted into the hole 10a to get hold of the workpiece 10 has a restricted allowable range. This allowable range of the inserting angle is defined by an angle between an central axis of the hole 10a and the axis of insertion of the tool at which the tool 3 can hold the workpiece by spreading the claws 3a.

In this example, the tool 3 has the full range of rotation around the central axis of the hole 10*a* and the restricted range of freedom with respect to the central axis of the hole 10*a* in the above case of the workpiece 10 and the tool 3. The allowable range of position/orientation of the tool is changed in accordance with the shape and dimensions of the workpiece to be picked up and a manner of getting hold of the workpiece. Specifically, in the case of a tool for get hold of a cylindrical workpiece by clamping the workpiece with a pair of claws on outer circumference of a cylindrical workpiece, the tool has an allowable range of translation in a direction along a central axis of the cylindrical workpiece. In this case of the tool and the workpiece, the tool has a predetermined allowable range of the position/orientation for getting hold of the workpiece in the direction of the central axis of the cylindrical workpiece which is determined based on dimensions of the workpiece and design of the claws.

Referring to FIGS. 2–5 again, FIG. 2 shows a state where the tool 3 does not interfere with the storage box 4. As shown in the plan view of FIG. 3, in the case where an objective workpiece is positioned near a corner of the storage box 4, the tool 3 may interfere with the storage box 4 in getting hold of the workpiece by inserting the claws into the hole 10*a*, as shown in FIG. 4*a*. If it is determined that an interference will possibly occur between the tool 3 and the storage box 4, it is assumed that the interference will occur between the tool 3 and a member such as a side wall of the storage box 4 which is closest to the objective workpiece. In this example, it is determined that a side wall 4*a* is a member of the storage box 4 closest to the objective workpiece 10.

Figure 4A:
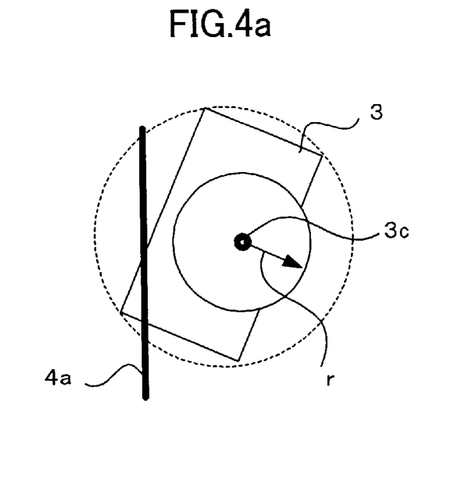
FIGS. 4a and 4b are schematic diagrams showing orientations of the tool in an interference and out of the interference by changing a rotational phase of the tool.
Figure 4B:
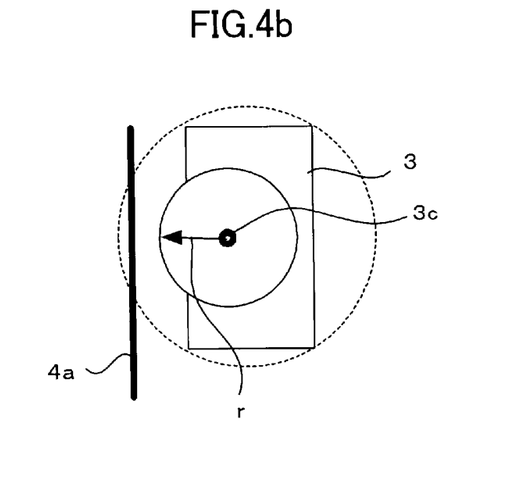

The rotational phase of the tool 3 is changed by rotating the tool 3 around a center 3*c* of rotation of the tool 3, i.e. the central axis of the hole 10*a* so that a portion on an outer contour of the tool 3 which has the smallest radius from the center 3*c* of rotation is directed to the closest side wall 4*a*. With this rotation of the tool 3, an interference between the tool 3 and the side wall 4*a* in the state of FIG. 4*a* will not occur in the state as shown in FIG. 4*b*.

Figure 5:
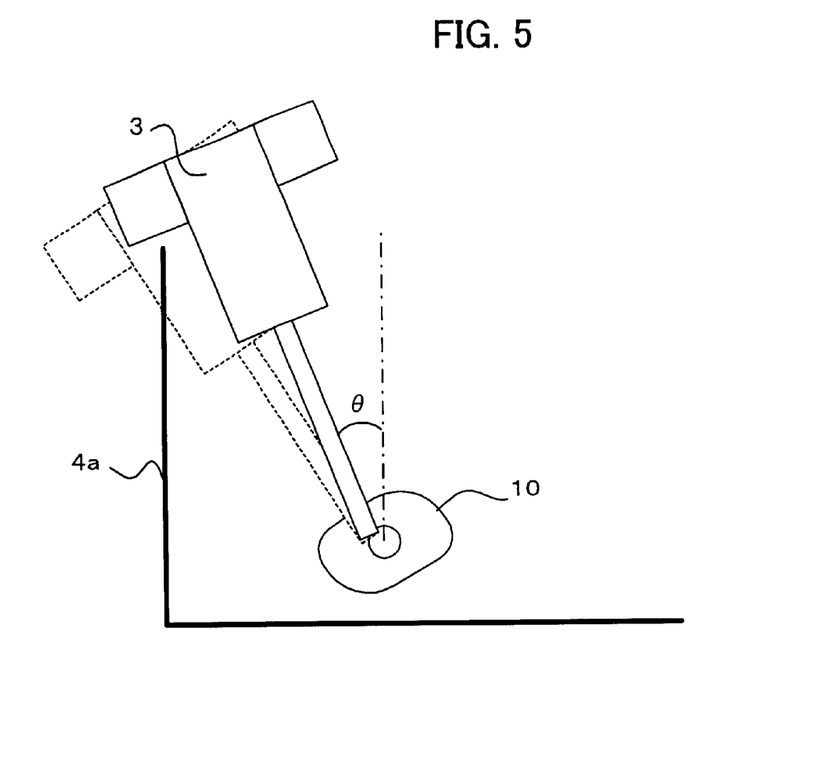
FIG. 5 is a schematic side view showing orientation of the tool for avoiding an interference by changing an inclination angle of the tool with respect to the objective workpiece.

In the case of occurrence of an interference as shown in FIG. 5, this interference is not avoided by changing the rotational phase of the tool 3. In this case, the direction of insertion of the claws which is the other factor of the allowable range of the position/orientation of the tool is changed. A critical angle θ at which the tool 3 is out of interference with the closest side wall 4*a* based on the position/orientation of the objective workpiece and the shape and dimensions of the storage box 4. Then, it is determined whether or not the critical angle θ is within the allowable range of inclination of the tool 3 and the workpiece. If it is determined that the critical angle θ is within the allowable range of inclination, the tool 3 is inclined by the critical angle θ to avoid the interference.

Described above is principle of an interference avoiding method in the first embodiment of the present invention. A concrete procedure for picking up workpieces stored randomly in a storage box will be described referring to a flowchart of FIG. 6.

Figure 6:
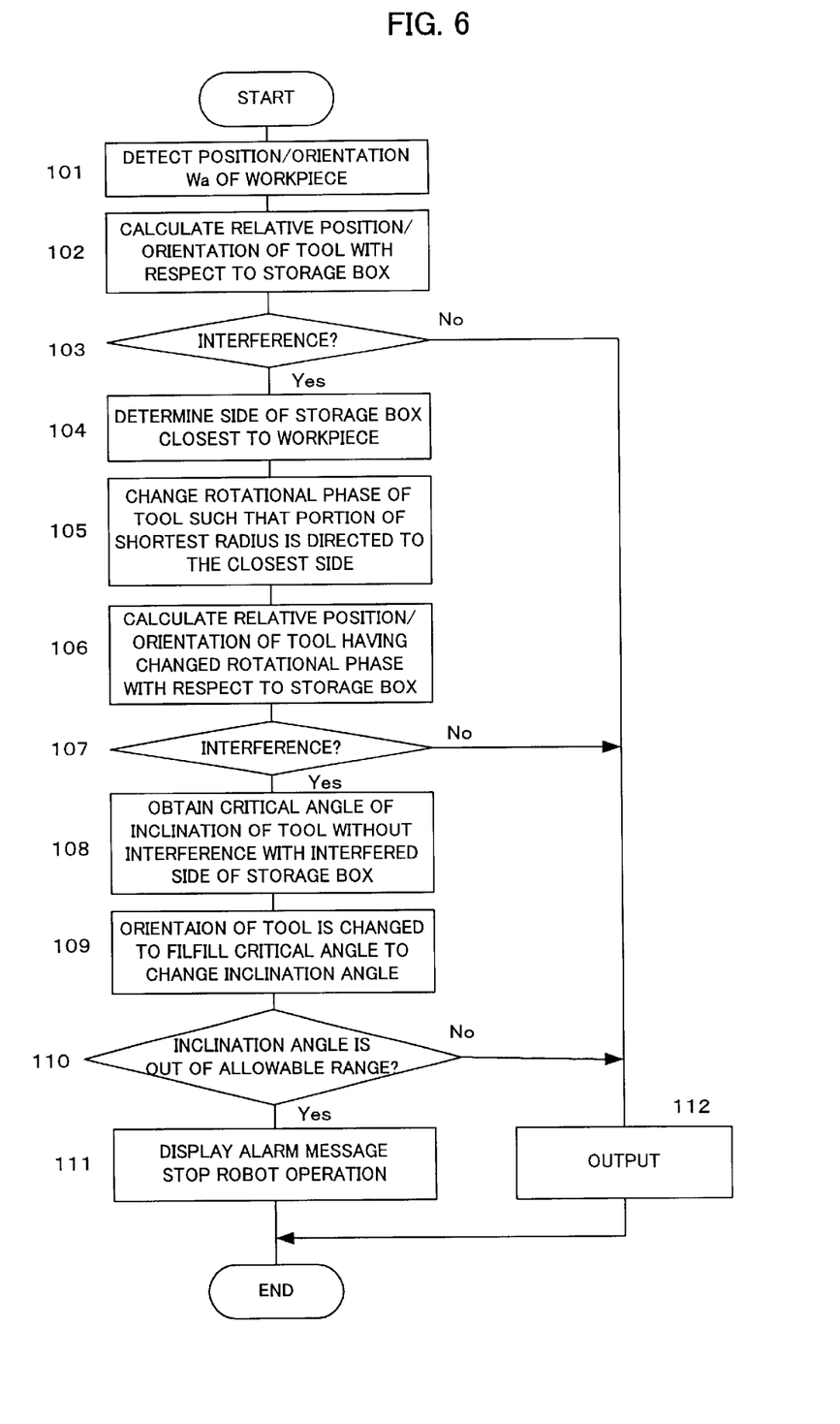
FIG. 6 is a flowchart of processing for avoiding interference according to a first embodiment of the present invention.

First, information on shape/dimensions of the tool 3 and shape/dimensions and position/orientation of the storage box 4, and the position/orientation Wn of the workpiece in the teaching operation, and the position/orientation Tn of the tool 3 for getting hold of the workpiece having the position/orientation Wn are determined and stored in the storage device of the robot controller 6. For example, the position/orientation Wn of the workpiece and the position/orientation Tn of the tool may be set based on CAD information in an off-line teaching device.

The robot is operated such that the camera 2 can capture an image including an objective workpiece in the storage box 4 and a position/orientation of the objective workpiece is detected based on the image captured by the camera 2 with the laser beam projection from the laser beam projector 1 (Step S101). The position/orientation Ta of the tool 3 for getting hold of the objective workpiece is obtained according to the equation (1) using the detected position/orientation Wa of the objective workpiece and the stored position/orientation Wn of the workpiece and the stored position/orientation Tn of the tool 3 in the teaching operation. A relative position/orientation of the tool 3 withe respect to the storage box 4 is calculated based on the obtained position/orientation Ta and the stored position/orientation of the storage box 4 (Step 102), and it is determined whether or not the tool 3 will interfere with the storage box 4 based on the relative position/orientation of the tool and the stored information on the shape and dimensions of the tool 3 and the shape and dimensions of the storage box 4 (Step 103).

If it is determined that an interference will not occur, the obtained position/orientation Ta of the tool 3 is outputted (Step S112), to terminate the interference avoiding processing. If it is determined that an interference will occur, a side member of the storage box 4 closest to the objective workpiece is determined (Step 104). In the example shown in FIG. 3, the side wall 4*a* is determined as the side member closest to the objective workpiece 10.

The rotational phase of the tool 3 is changed such that a portion having the shortest radius from a central axis of rotation of the tool 3, i.e. a longitudinal insertion axis of the claws, is directed to the closest side wall 4*a*, and a position/orientation of the tool 3 with the changed rotational phase is calculated (Step 105). It is further determined whether or not an interference will occur between the tool 3 having the calculated new position/orientation and the storage box 4 (Steps 106 and 107). If it is determined that any interference will not occur in Step 107, the position/orientation of the tool 3 obtained in Step 105 is outputted (Step 112).

If it is determined that an interference will occur in Step 107, a critical angle θ of inclination of the tool 3 at which the tool 3 does not interfere with the closest wall 4*a* of the storage box 4 is obtained (Step 108), and the information of the position/orientation of the tool 3 is changed such that orientation fulfills the condition of the critical angle θ to change the inclination angle with respect to the objective workpiece (Step 108, 109). It is determined whether or not the inclination angle of the tool is within the allowable range of inclination with respect to the central axis 10*a* of the workpiece (Step 110). If it is determined that the inclination angle is within the allowable range, the position/orientation obtained at Step 109 is outputted.

If it is determined that the inclination angle is not within the allowable range in Step 110, it is decided that the interference can not avoid in this operation and an alarm message is displayed on the display device of the robot controller 6 and also the operation of the robot 5 is stopped (Step 111).

Thus, when an alarm message is displayed on the display device and the operation of the robot is stopped, it means that the robot can not pick up an objective workpiece without interference with the storage box 4. This may be caused for a reason that the objective workpiece positions near a corner of the storage box 4. In this case, an operator may move the objective workpiece manually in the storage box 4 and then operate a restart switch on the teaching operation panel so that the robot resumes the picking-up operation from the processing of Step 101.

An interference between the tool 3 and the storage box 4 is determined and avoided in the above embodiment. Besides the storage box 4, if there is any peripheral object which has possibility of causing an interference with the tool 3, shape/dimensions and position/orientation of such object are determined and stored in the storage device of the robot controller 6, and an interference of the tool 3 with the object can be detected and avoided in the manner same as the above-described interference avoiding processing.

Further, in the case where there is a possibility of causing an interference between the robot itself, including a robot arm and a wrist, etc., and the storage box 4 or peripheral objects, such interference can be detected and avoided. In this case, shape/dimensions of the robot are additionally stored in the storage device of the robot controller 6 and an interference between the robot and the object is determined based on the position/orientation of the robot in getting hold of an objective workpiece by the tool 3 and the information on the shape/dimensions of the robot.

In the above embodiment, the angular phase and/or the inclination angle of the tool are automatically changed when it is determined that an interference will occur. Alternatively, the position/orientation of the tool may be newly taught to be changed when it is determined that an interference will occur. Such processing for changing the position/orientation of the tool will be described referring to FIG. 7 as a second embodiment.

Figure 7:
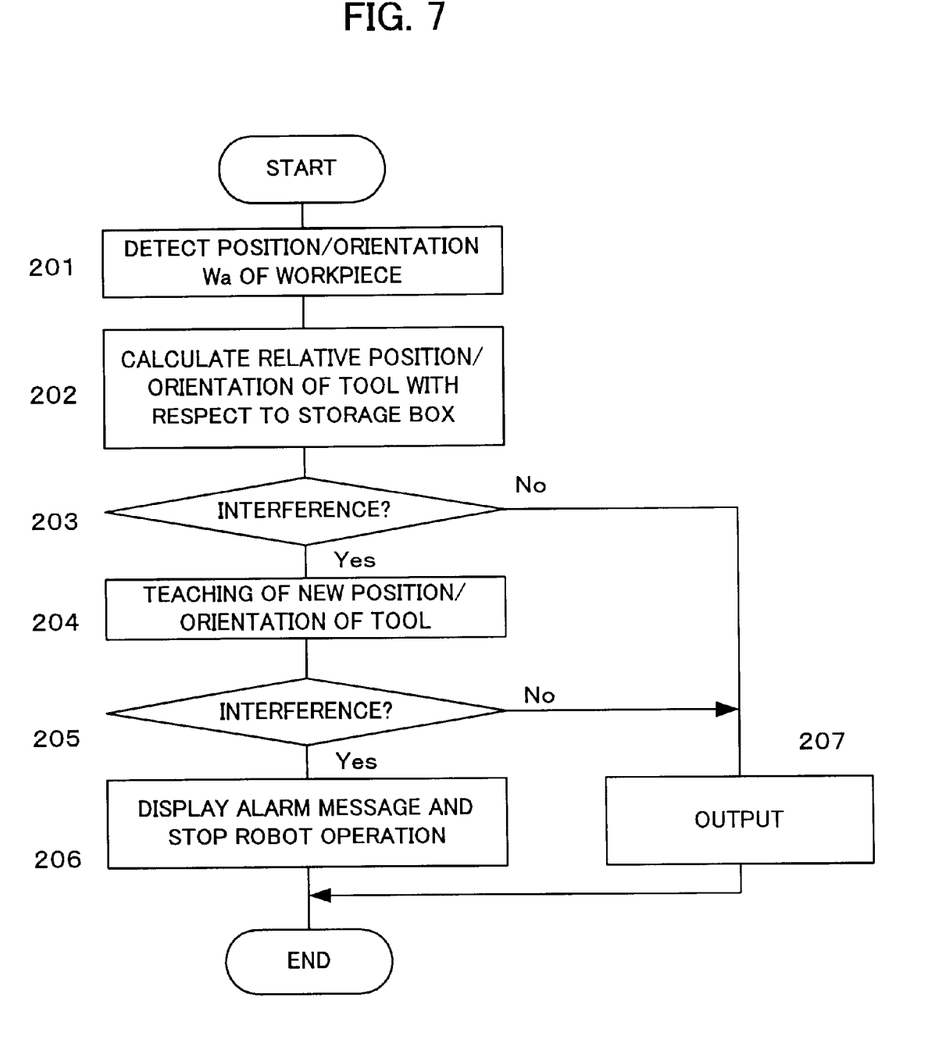
FIG. 7 is a flowchart of processing for avoiding interference according to a second embodiment of the present invention.

First, an image of workpieces including an objective workpiece is captured and position/orientation Wa of the objective workpiece is obtained (Step 201), the position/orientation Ta of the tool 3 is obtained based on the obtained position/orientation Wa of the workpiece, and a relative position/orientation of the tool with respect to the storage box is calculated (Step 202), and it is determined whether or not an interference will occur (Step 203) in the same manner as the processing from Step 101 to Step 103 in the first embodiment. If it is determined that an interference will not occur, the obtained position/orientation Ta of the tool is outputted (Step 207) in the same manner as the processing of Step 112 in the first embodiment.

If it is determined that an interference will occur in Step 203, new position/orientation of the tool to be appropriate for avoiding the interference is taught by an operator by directly inputting information thereon or through a teaching operation by operating the robot with manual feed visually confirming the position/orientation of the tool with respect to the objective workpiece (Step 204). It is determined whether or not an interference will occur on the condition of the renewed position/orientation of the tool, the information on the shape/dimensions of the tool, the information on the position/orientation and the shape/dimensions of the storage box (Step 205). If it is determined that an interference will not occur in Step 205, the renewed position/orientation of the tool is outputted (Step 207). If it is determined that an interference will occur on the renewed condition, an alarm is issued and the operation of the robot is stopped (Step 206).

If it is determined in Step 205 that the interference is avoided by the newly taught position/orientation of the tool at Step 204, the newly taught position/orientation of the tool may be stored in the memory for automatically applying the stored position/orientation when the same interference is prospected. Further, in this second embodiment also, an interference of the tool with peripheral objects other than the storage box can be detected and avoided, and an interference of the robot itself with the storage box and the peripheral objects can be detected and avoided in the same manner as described on the first embodiment.

Figure 8:
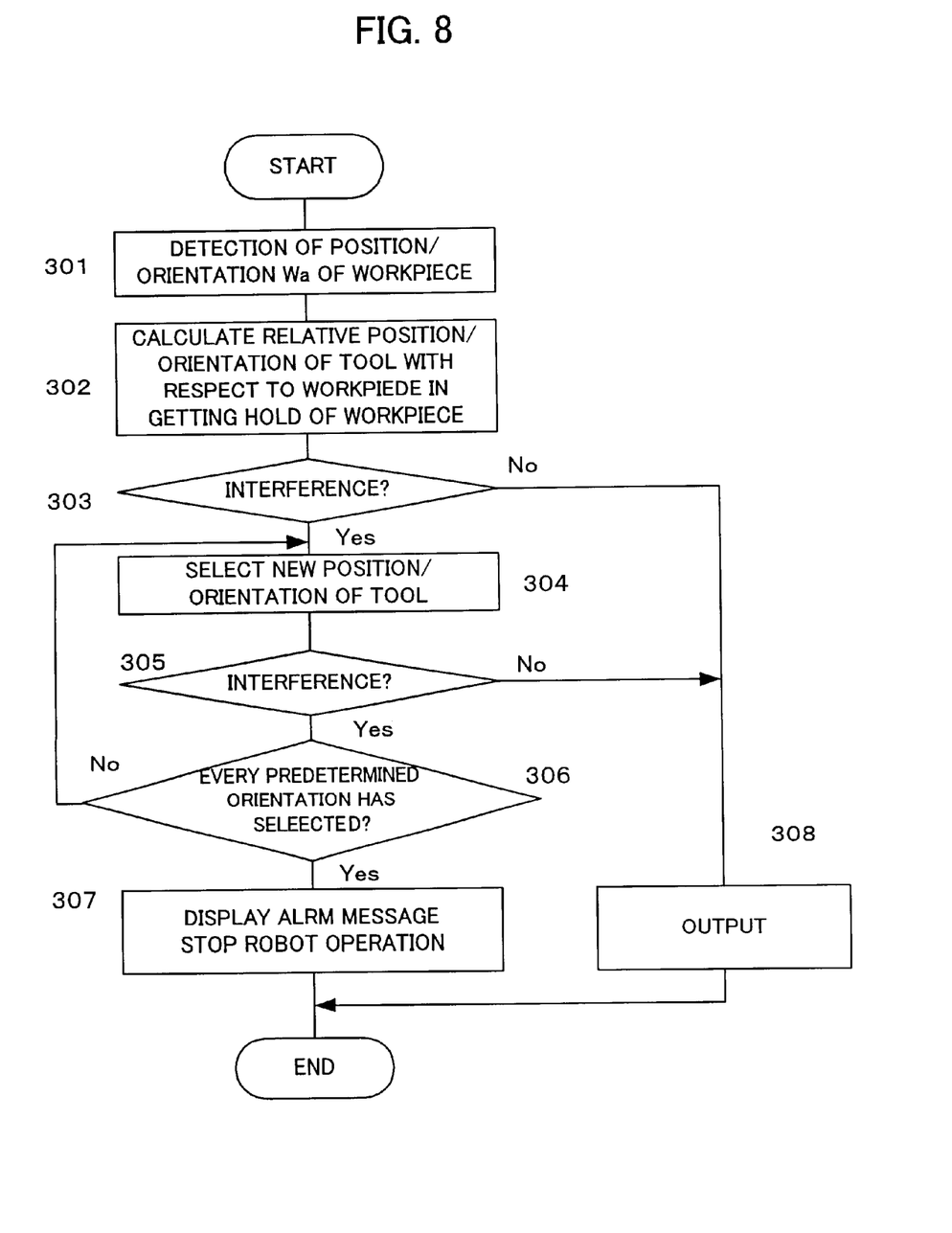
FIG. 8 a flowchart of processing for avoiding interference according to a third embodiment of the present invention.

FIG. 8 shows a flowchart of processing for determination and avoiding an interference according to a third embodiment.

In this third embodiment, when it is determined that an interference will occur, the orientation of the tool is changed to any of a predetermined plurality of orientations and it is determined whether or not the an interference will occur with the changed position/orientation of the tool. The plurality of predetermined orientations of the tool may include orientations with which operating portions, such as fingers and claws, of the tool are directed vertically downward, inclined at a predetermined angle, i.e., 20 degree with respect to the vertical line toward a center of the tool box, etc.

First, an image of an objective workpiece is captured by the camera and position/orientation Wa of the workpiece is obtained (Step 301), the position/orientation Ta of the tool 3 for getting hold of the detected objective workpiece is obtained, a relative position/orientation of the tool 3 with respect to the storage box 4 is obtained (Step 302), and it is determined whether or not an interference will occur (Step 303), in the same manner as the processing from Step 101 to Step 103 in the first embodiment. If it is determined that an interference will not occur in Step 303, the obtained position/orientation Ta of the tool is outputted (Step 308) in the same manner as the processing of Step 112 in the first embodiment.

If it is determined that an interference will occur in Step 303, one of the predetermined orientations of the tool stored in the storage device is selected (Step 304) and it is determined whether an interference will occur or not on the new condition of the position/orientation of the tool with the selected orientation (Step 305). If it is determined that an interference will not occur in Step 305, the new position/orientation of the tool with the selected orientation is outputted (Step 308). If it is determined that an interference will occur on the new condition, next one of the predetermined orientations is selected (Step 304) and it is determined whether or not an interference will occur on the new condition of the position/orientation of the tool with the newly selected orientation (Step 305). If it is determined that an interference will not occur in Step 305, the new position/orientation of the tool is outputted (Step 308). If it is determined that an interference will occur on every condition of the position/orientation of the tool with every predetermined orientation, an alarm is issued and the operation of the robot is stopped (Step 307).

Further, in this third embodiment also, an interference of the tool with peripheral objects other than the storage box can be detected and avoided, and an interference of the robot itself with the storage box and the peripheral objects can be detected and avoided in the same manner as described on the first embodiment.

In the foregoing embodiments, the interference avoiding device is incorporated into the robot controller. The interference avoiding device may be comprised of an information processing device such as a personal computer connected to the robot or incorporated into the robot controller. Particularly, it is preferable to incorporate the interference avoiding device into a simulation device for simulating an operation of a robot for use in off-line teaching of an operation of the robot. In these cases, it is necessary to set and store information on shape/dimensions of a robot, a tool, a storage box, peripheral objects; position/orientation of a workpiece and the tool in get hold of a workpiece in teaching operation; and programs for carrying out the above-described interference avoiding processing in the information processing device. The information processing device such as the simulation device executes the foregoing processing of determining and avoiding an interference as shown in FIGS. 6, 7 and 8, and if it is determined that an interference will not occur, the information processing device may rewrite an operation program of the robot to store the position/orientation of the tool for picking up the objective workpiece, instead of outputting the position/orientation of the tool to the robot in Steps 112, 207 and 308.

In the foregoing embodiments, the description is made on an operation of a robot for picking up a workpiece by getting hold of the workpiece by a tool. The interference avoiding device of the present invention man be applied to robot operations such as arc welding, spot welding, sealing, etc. to be carried out by a tool attached to the robot, so that an interference between the tool or the robot itself and peripheral objects is prospected and avoided.

The robot may be arranged at arbitrary position to be directly or indirectly fixed on a structure fixed on a floor, a wall, a ceiling, etc. Further, the robot may be arranged movable along one or two axes. For example, the robot may be moved on rails extending along an X-axis and a Y-axis perpendicular to each other. In this case, the robot controller may control the robot, regarding the X-axis and the Y-axis on which the robot is moved as additional axis of the robot. Alternatively, a controller other than the robot controller may control motions of the robot on these axes. With these arrangements capable of moving the robot itself, the robot can take an appropriate position/orientation which does not cause an interference.

Further, the present invention can be applied to an operation of a robot for detecting position/orientation of an objective workpiece twice or more by the visual sensor. In this case, a visual field of the visual sensor is regarded as an allowable range of the position/orientation. For example, for determining the position/orientation of a camera of the visual sensor in a second detection based on a result of a first detection, the position/orientation of the camera in the second detection is determined such that an optical axis of the camera in the second detection coincides with a line of sight on an objective workpiece in the first detection, to securely detect the position/orientation of the objective workpiece in a field of vision of the visual sensor, even if the objective workpiece is at arbitrary position in the field of vision in the first detection. The allowable range of the position/orientation of the camera is the field of vision in the first detection.

Further, in the foregoing embodiments, a three-dimensional visual sensor for detecting three-dimensional position/orientation including a distance between the camera and the objective workpiece by the combination of the camera and the laser beam projector. In the case where an objective workpiece is placed at a predetermined position and the distance between the camera and the objective workpiece is already known, a two-dimensional visual sensor without projection of the laser beam can be adopted.

According to the present invention, an interference between a device such as a tool attached to a distal end of a robot or the robot itself and a peripheral object around an objective of operation such as a storage box is automatically determined, and if it is determined that an interference will occur, the interference is securely avoided.

What is claimed is:

1. An interference avoiding device for avoiding an interference between an operational device attached to a robot and a peripheral object, comprising:
   storing means for storing information on shape/dimensions of the operational device, and shape/dimensions and position/orientation of the peripheral object;
   interference determining means for determining an interference between the operational device and the peripheral object based on the information stored in said storing means and a commanded position/orientation of the operational device;
   position/orientation setting means for setting a new position/orientation of the operational device for avoiding the interference between the operational device and the peripheral object in place of the commanded position/orientation of a tool, when the interference avoiding device is determined that an interference will occur by said interference determining means.

2. An interference avoiding device according to claim 1, wherein said position/orientation setting means automatically determines the new position/orientation of the operational device for avoiding the interference.

3. An interference avoiding device according to claim 1, wherein said position/orientation setting means determines the new position/orientation of the operational device by selecting one of a plurality of predetermined positions/orientations.

4. An interference avoiding device according to claim 1, wherein said position/orientation setting means sets position/orientation of the operational device for avoiding the interference as a new taught position/orientation.

5. An interference avoiding device according to claim 1, further comprising means for continuously operating the robot in accordance with the new position/orientation of the operational device.

6. An interference avoiding device according to claim 1, wherein said position/orientation setting means stops an operation of the robot when the interference avoiding device is determined that an interference will occur by said interference determining means.

7. An interference avoiding device according to claim 1, further comprising determining means for determining an interference between the operational device and the peripheral object on condition of the new position/orientation of the operational device, and display means for displaying a message when the interference avoiding device is determined that an interference will occur by said determining means.

8. An interference avoiding device according to claim 1, further comprising determining means for determining an interference between the operational device and the peripheral object on condition of the new position/orientation of the operational device, and control means for suspending an operation of the robot when the interference avoiding device is determined that an interference will occur by said determining means and then resuming the operation of the robot.

9. An interference avoiding device according to claim 1, wherein said position/orientation setting means rewrites an operation program of the robot by replacing the commanded position/orientation of the tool with the new position/orientation for avoiding the interference.

10. An interference avoiding device according to claim 1, wherein said interference determining means determines an interference between the operational device and the peripheral object in operation of the robot.

11. An interference avoiding device according to claim 1, wherein said interference avoiding device is incorporated into a robot controller or an information processing device connected to the robot.

12. An interference avoiding device according to claim 11, wherein said information processing device includes an operation simulation device of the robot.

13. An interference avoiding device according to claim 1, wherein the new position/orientation of the operational device is used for obtaining information by means a sensor attached to the robot.

14. An interference avoiding device according to claim 1, wherein the commanded position/orientation of the operational device is determined based on information obtained by a sensor attached to the robot.

15. An interference avoiding device according to claim 14, wherein said storing means stores information on position/orientation of a workpiece in a teaching operation and position/orientation of a tool as the operational device for holding the workpiece in the teaching operation, and the commanded position/orientation of the tool is determined based on the determined position/orientation of the workpiece and the stored information on the positions/orientations of the workpiece and the tool in the teaching operation.

16. An interference avoiding device according to claim 14, wherein said storing means stores information on position/orientation of a tool as the operational device for holding a workpiece with respect to position/orientation of the workpiece in a teaching operation based on CAD information in an off-line teaching device, and the commanded position/orientation of the tool is determined based on the determined position/orientation of the workpiece and the stored information on the position/orientation of the tool with respect to the position/orientation of the workpiece.

17. An interference avoiding device according to claim 14, wherein said sensor comprises a two-dimensional sensor or a three-dimensional sensor.

18. An interference avoiding device according to claim 14, wherein the operation to be performed by the robot is a picking operation of picking up a workpiece by the operational device, and the peripheral object is a storage box storing workpieces.

19. An interference avoiding device according to claim 14, wherein the operation to be performed by the robot is one of spot welding, arc welding and sealing.

20. An interference avoiding device according to claim 14, wherein the robot is directly or indirectly fixed to a structure fixed on a floor, a wall or a ceiling.

21. An interference avoiding device according to claim 14, wherein the robot is arranged to be movable along one or two axes.

22. An interference avoiding device for avoiding an interference between a robot and a peripheral object, comprising:
   storing means for storing information on shape/dimensions of the robot, and shape/dimensions and position/orientation of the peripheral object;
   interference determining means for determining an interference between the robot and the peripheral object based on the information stored in said storing means and a commanded position/orientation of the robot;
   position/orientation setting means for setting a new position/orientation of the robot for avoiding the interference between the robot and the peripheral object in place of the commanded position/orientation of the robot, when the interference avoiding device is determined that an interference will occur by said interference determining means.

23. An interference avoiding device according to claim 22, wherein said position/orientation setting means automatically determines the new position/orientation of the robot for avoiding the interference.

24. An interference avoiding device according to claim 23, wherein said position/orientation setting means determines the new position/orientation of the robot by selecting one of a plurality of predetermined positions/orientation of the robot.

25. An interference avoiding device according to claim 22, wherein said position/orientation setting means sets position/orientation of the robot for avoiding the interference as a new taught position/orientation.

26. An interference avoiding device according to claim 22, further comprising means for continuously operating the robot in accordance with the new position/orientation of the robot.

27. An interference avoiding device according to claim 22, wherein said position/orientation setting means stops an operation of the robot when the interference avoiding device is determined that an interference will occur by said interference determining means.

28. An interference avoiding device according to claim 22, further comprising determining means for determining an interference between the robot and the peripheral object on condition of the new position/orientation of the robot, and display means for displaying a message when the interference avoiding device is determined that an interference will occur by said determining means.

29. An interference avoiding device according to claim 22, further comprising determining means for determining an interference between the operational device and the peripheral object on condition of the new position/orientation of the operational device, and control means for suspending an operation of the robot when the interference avoiding device is determined that an interference will occur by said determining means and resuming the operation of the robot.

30. An interference avoiding device according to claim 22, wherein said controller rewrites an operation program of the robot by replacing the commanded position/orientation of the robot with the new position/orientation for avoiding the interference.

31. An interference avoiding device according to claim 22, wherein said interference determining means determines an interference between the robot and the peripheral object in operation of the robot.

32. An interference avoiding device according to claim 22, wherein said interference avoiding device is incorporated into a robot controller or an information processing device connected to the robot.

33. An interference avoiding device according to claim 32, wherein said information processing device includes an operation simulation device of the robot.

34. An interference avoiding device according to claim 22, wherein the new position/orientation of the robot is used for obtaining information by means a sensor attached to the robot.

35. An interference avoiding device according to claim 22, wherein the commanded position/orientation of the robot is determined based on information obtained by a sensor attached to the robot.

36. An interference avoiding device according to claim 35, wherein said storing means stores information on position/orientation of a workpiece in a teaching operation and position/orientation of the robot for performing an operation on the workpiece in the teaching operation, and the commanded position/orientation of the robot is determined based on the position/orientation of the workpiece obtained by said sensor, and the stored information on the positions/orientations of the workpiece and the robot in the teaching operation.

37. An interference avoiding device according to claim 35, wherein said storing means stores information on position/orientation of the robot with respect to position/orientation of the workpiece in a teaching operation based on CAD information in an off-line teaching device, and the commanded position/orientation of the robot is determined based on the position/orientation of the workpiece obtained by said sensor and the stored information on the position/orientation of the robot with respect to the position/orientation of the workpiece.

38. An interference avoiding device according to claim 35, wherein said sensor comprises a two-dimensional sensor or a three-dimensional sensor.

39. An interference avoiding device according to claim 35, wherein the operation to be performed by the robot is a picking-up operation of picking up a workpiece, and the peripheral object is a storage box storing workpieces.

40. An interference avoiding device according to claim 35, wherein the operation to be performed by the robot is spot welding, arc welding or sealing.

41. An interference avoiding device according to claim 35, wherein the robot is directly or indirectly fixed to a structure fixed on a floor, a wall or a ceiling.

42. An interference avoiding device according to claim 35, wherein the robot is arranged to be movable along one or two axes.

* * * * *

UNITED STATES PATENT AND TRADEMARK OFFICE
CERTIFICATE OF CORRECTION

PATENT NO. : 6,597,971 B2
DATED : July 22, 2003
INVENTOR(S) : Ichiro Kanno

It is certified that error appears in the above-identified patent and that said Letters Patent is hereby corrected as shown below:

<u>Title page,</u>
Item [57], ABSTRACT,
Line 13, change "an" to -- and --.

<u>Column 4,</u>
Line 65, change "an" to -- a -- (second occurrence).

<u>Column 6,</u>
Line 12, change "withe" to -- with --.

<u>Column 9,</u>
Line 13, change "man" to -- may --.

Signed and Sealed this

Eighteenth Day of May, 2004

JON W. DUDAS
*Acting Director of the United States Patent and Trademark Office*